(12) United States Patent
Togashi

(10) Patent No.: US 8,659,872 B2
(45) Date of Patent: Feb. 25, 2014

(54) MULTILAYER CAPACITOR THAT INCLUDES A CAPACITOR ELEMENT BODY AND AT LEAST FOUR TERMINAL UNITS

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 12 days.

(21) Appl. No.: 13/354,745

(22) Filed: Jan. 20, 2012

(65) Prior Publication Data

US 2012/0188681 A1    Jul. 26, 2012

(30) Foreign Application Priority Data

Jan. 24, 2011   (JP) ................... P2011-012027

(51) Int. Cl.
*H01G 4/228*    (2006.01)
*H01G 4/06*    (2006.01)

(52) U.S. Cl.
USPC .................... 361/306.3; 361/321.2

(58) Field of Classification Search
USPC .................... 361/306.3, 303, 321.2
See application file for complete search history.

(56) References Cited

U.S. PATENT DOCUMENTS

| | | | |
|---|---|---|---|
| 6,765,781 B2 | 7/2004 | Togashi | |
| 7,630,208 B2 | 12/2009 | Lee et al. | |
| 7,646,586 B2 * | 1/2010 | Togashi | 361/306.3 |
| 8,031,460 B2 | 10/2011 | Togashi | |
| 8,050,012 B2 | 11/2011 | Lee et al. | |
| 8,117,584 B2 * | 2/2012 | Lee et al. | 716/137 |
| 8,213,155 B2 * | 7/2012 | Lee et al. | 361/329 |
| 2009/0154055 A1 * | 6/2009 | Takashima et al. | 361/301.4 |

FOREIGN PATENT DOCUMENTS

| | | |
|---|---|---|
| EP | 1953777 A1 * | 8/2008 |
| JP | A-08-162368 | 6/1996 |
| JP | A-11-340087 | 12/1999 |
| JP | A-2000-223348 | 8/2000 |
| JP | A-2000-243657 | 9/2000 |
| JP | A-2001-185449 | 7/2001 |
| JP | A-2003-168620 | 6/2003 |
| JP | A-2009-060114 | 3/2009 |
| JP | A-2009-135416 | 6/2009 |
| JP | A-2009-194169 | 8/2009 |

* cited by examiner

*Primary Examiner* — David M Sinclair
(74) *Attorney, Agent, or Firm* — Oliff PLC

(57) ABSTRACT

A multilayer capacitor comprises a capacitor element body, a first terminal electrode connected to a first inner electrode, a second terminal electrode connected to a second inner electrode, a third terminal electrode connected to a third inner electrode, and a fourth terminal electrode connected to a fourth inner electrode. The capacitor element body includes therewithin a first capacitor unit having first and second inner electrodes stacked adjacent to each other through a dielectric layer and a second capacitor unit having third and fourth inner electrodes stacked adjacent to each other through a dielectric layer. The first and second terminal electrodes have high resistance layers exhibiting electrical resistances higher than those of the third and fourth terminal electrodes.

8 Claims, 17 Drawing Sheets

*Fig.6*
(a) 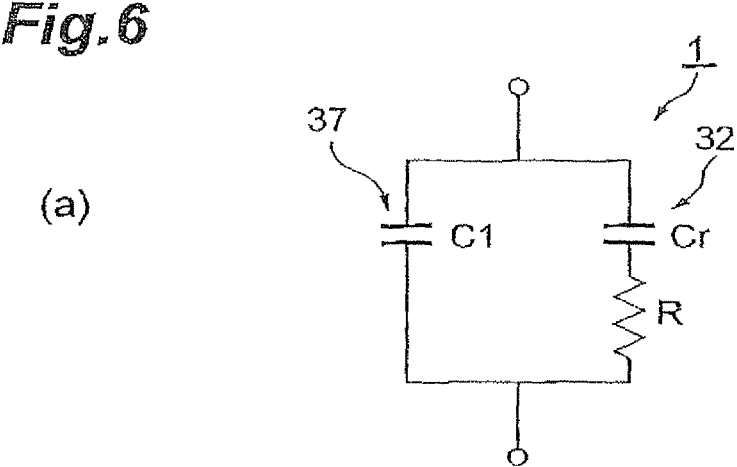
(b) 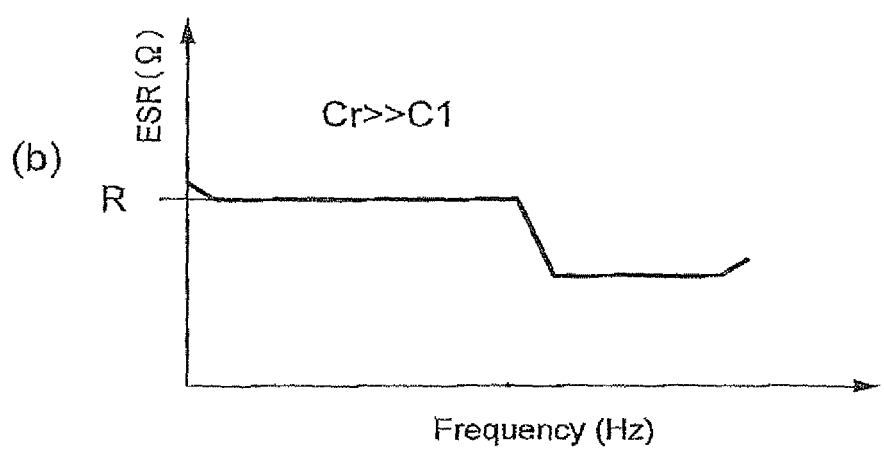
(c) 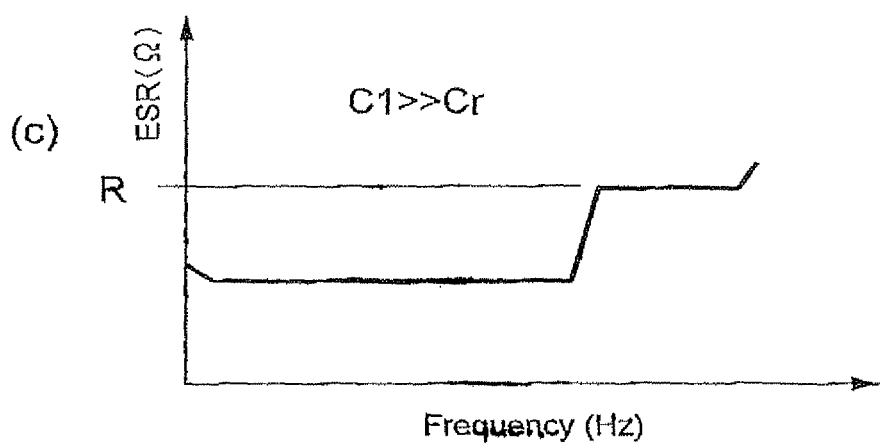

Fig.11
(a) 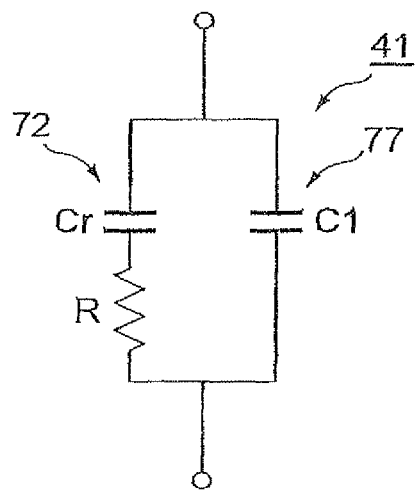
(b) 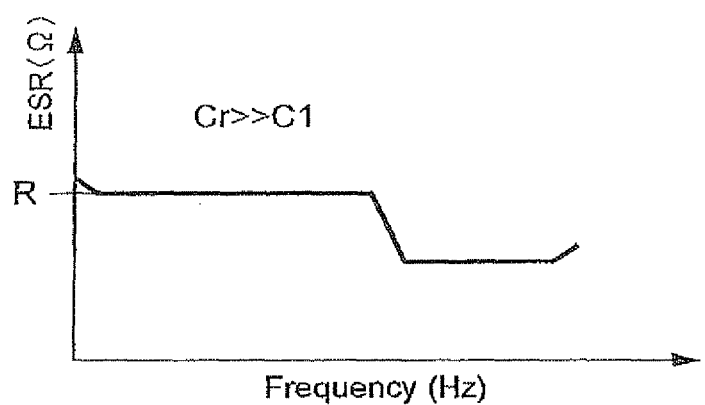
(c) 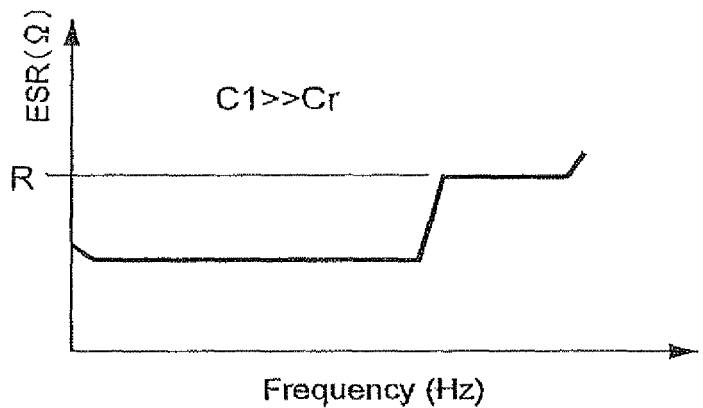

*Fig.15*
(a) 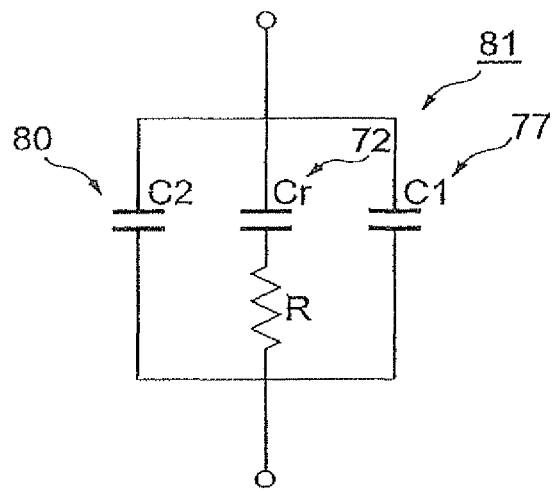
(b) 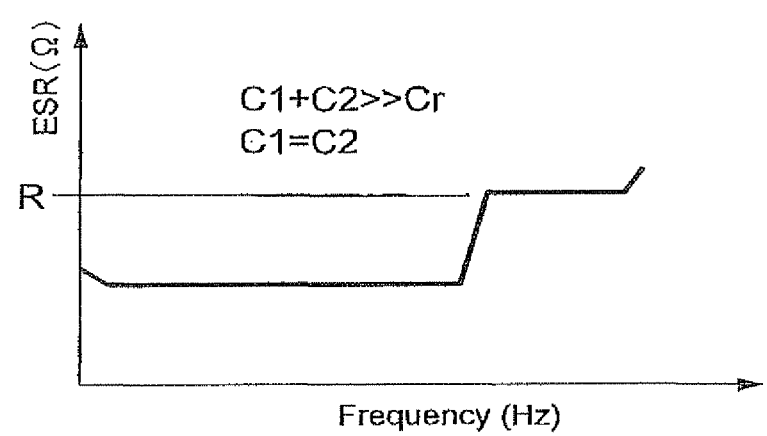
(c) 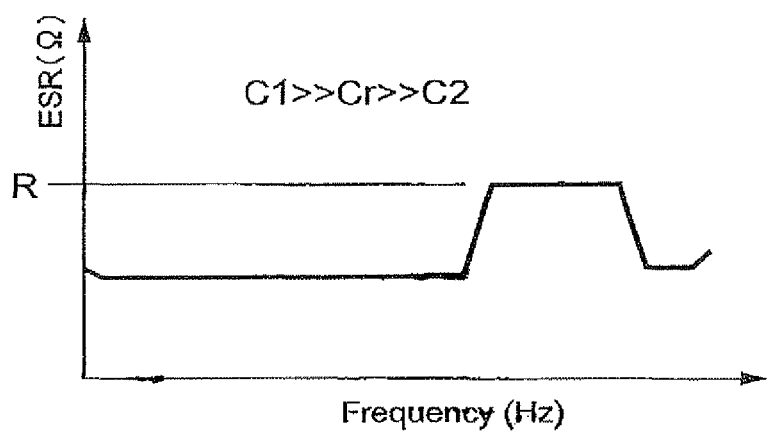

Fig.17
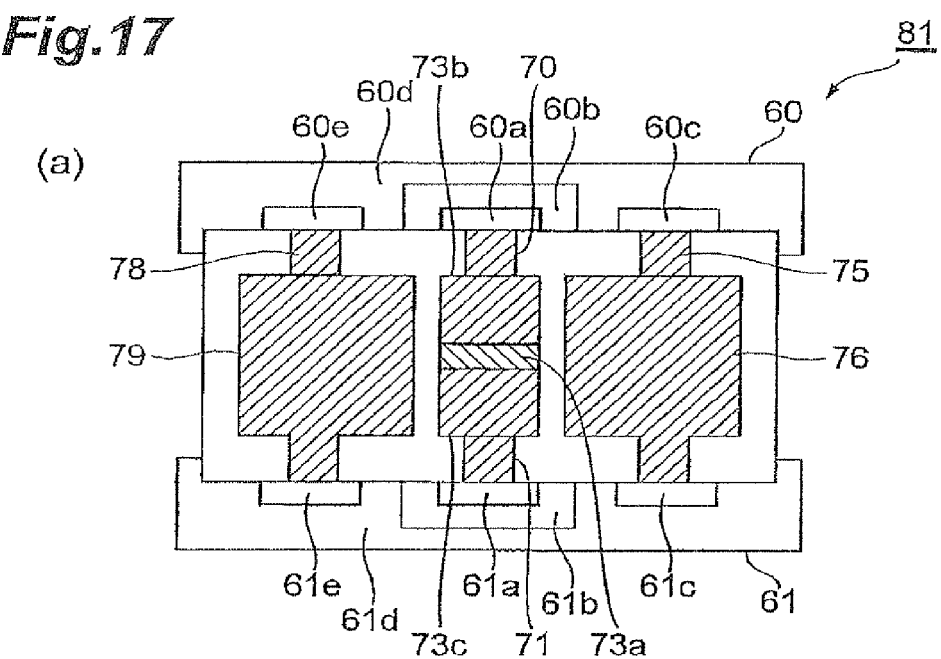
(a)
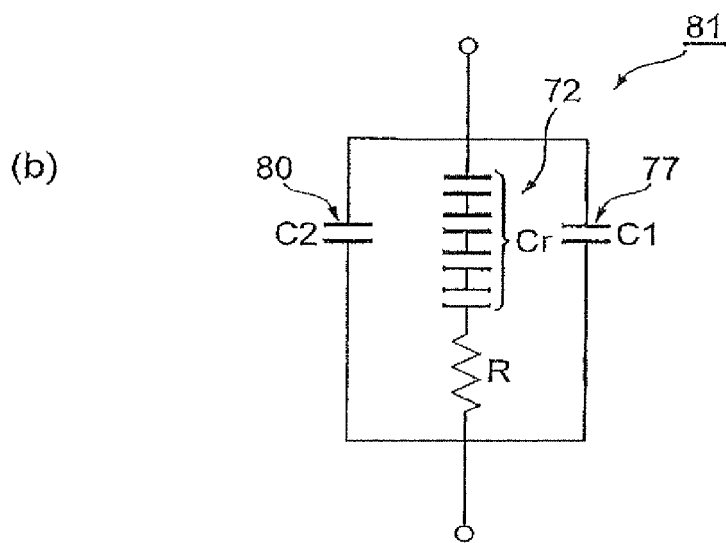
(b)

MULTILAYER CAPACITOR THAT INCLUDES A CAPACITOR ELEMENT BODY AND AT LEAST FOUR TERMINAL UNITS

BACKGROUND OF THE INVENTION

1. Field of the Invention

The present invention relates to a multilayer capacitor.

2. Related Background Art

There has been known a multilayer capacitor comprising a multilayer body formed by alternately stacking dielectric layers and inner electrodes, and terminal electrodes and connecting conductors which are electrically insulated from each other on side faces of the multilayer body. For example, the multilayer capacitor disclosed in Japanese Patent Application Laid-Open No. 2003-168620 is provided with three kinds of inner electrodes, among which the first inner electrode is connected to one terminal electrode and connecting conductors, while the second inner electrode is connected to the other terminal electrode. The third inner electrode is connected to the connecting conductors. Such a multilayer capacitor is employed for various purposes by increasing ESR.

SUMMARY OF THE INVENTION

The multilayer capacitor disclosed in Japanese Patent Application Laid-Open No. 2003-168620 is used as a decoupling capacitor in an IC (Integrated Circuit), for example. It has been required for such a multilayer capacitor to achieve ESR (Equivalent Series Resistance) control in a wide frequency band.

It is an object of the present invention to provide a multilayer capacitor which can control the ESR in a wide frequency band.

The multilayer capacitor in accordance with the present invention comprises a capacitor element body, a first terminal unit, a second terminal unit, a third terminal unit, and a fourth terminal unit. The capacitor element body has a first capacitor unit including first and second inner electrodes stacked adjacent to each other through a dielectric layer and a second capacitor unit including third and fourth inner electrodes stacked adjacent to each other through a dielectric layer. The first terminal unit is arranged on an outer surface of the capacitor element body and connected to the first inner electrode. The second terminal unit is arranged on the outer surface of the capacitor element body and connected to the second inner electrode. The third terminal unit is arranged on the outer surface of the capacitor element body and connected to the third inner electrode. The fourth terminal unit is arranged on the outer surface of the capacitor element body and connected to the fourth inner electrode. In the multilayer capacitor, at least one of the first and second terminal units has a high resistance part exhibiting an electrical resistance higher than that of the third and fourth terminal units.

In the multilayer capacitor in accordance with the present invention, at least one of the first and second terminal units connected to the inner electrode constituting the first capacitor unit has a high resistance part exhibiting an electrical resistance higher than that of the third and fourth terminal units. In this case, an assembly constructed by the terminal unit having the high resistance part and the first capacitor unit can serve as an ESR control capacitor unit which can control the ESR value, whereby a composite capacitor comprising a general capacitor unit and the ESR control capacitor unit can be formed. Mounting such a composite capacitor on a circuit substrate or the like such that the general capacitor unit and ESR control capacitor unit are parallel to each other makes it possible to control the ESR value in a wide frequency band.

In the above-mentioned multilayer capacitor, the first to fourth terminal units may be constituted by first to fourth terminal electrodes, respectively, while the capacitor may be used in a mounting structure for connecting the first and third terminal electrodes so as to be same polarity and the second and fourth terminal electrodes so as to be same polarity or a mounting structure for connecting the first and fourth terminal electrodes so as to be same polarity and the second and third terminal electrodes so as to be same polarity. This can generate a capacitance by either connecting the first and third terminal electrodes so as to be same polarity or the first and fourth terminal electrodes so as to be same polarity, since they are separated into the first and second capacitor units.

At a boundary region between the first and second capacitor units in the above-mentioned multilayer capacitor, the first or second inner electrode located closer to the second capacitor unit in the first capacitor unit and the third or fourth inner electrode located closer to the first capacitor unit in the second capacitor unit may be connected so as to be same polarity. This can separate two ESR components from each other without combining them, whereby an ESR component in a specific frequency band can be controlled.

In the above-mentioned multilayer capacitor, one first capacitor unit and two second capacitor units may form a sandwich structure in the stacking direction. In this case, the multilayer capacitor attains a symmetrical structure, thereby eliminating its mounting directivity and inhibiting characteristics from fluctuating.

In the above-mentioned multilayer capacitor, the capacitor element body may exhibit a rectangular parallelepiped form, while the first and second terminal electrodes may be arranged on longitudinal side faces of the capacitor element body. In this case, the first and second terminal electrodes can be formed such that they reliably have the high resistance part.

In the first and second capacitor units in the above-mentioned multilayer capacitor, the one having a lower capacitance may be arranged on a mounting surface side. This can reduce ESL (Equivalent Series Inductance).

In the above-mentioned multilayer capacitor, the first capacitor unit may have a capacitance higher than that of the second capacitor unit. This can yield higher ESR in a lower frequency band.

In the above-mentioned multilayer capacitor, the second capacitor unit may have a capacitance higher than that of the first capacitor unit. This can yield higher ESR in a higher frequency band.

In the above-mentioned multilayer capacitor, the first and third terminal units may be integrated into a first integral terminal electrode, while the second and fourth terminal units may be integrated into a second integral terminal electrode. This can prevent wrong connections from being made at the time of mounting, since the first to fourth terminal units are integrated into two terminal electrodes. Forming the terminal units into two terminal electrodes also facilitates the making of the capacitor.

In the above-mentioned multilayer capacitor, at least one of the sets of the first and third inner electrodes and the second and fourth inner electrodes may be arranged on the same plane in the stacking direction. This can reduce the number of stacked layers, since two kinds of inner electrodes are arranged on the same plane.

In the above-mentioned multilayer capacitor, the capacitor element body may further comprise a third capacitor unit including fifth and sixth inner electrodes stacked adjacent to each other through a dielectric layer. In this multilayer capacitor, the first to third capacitor units may have respective capacitances decreasing in the order of the second, first, and third capacitor units. This can yield higher ESR in a medium band.

The above-mentioned multilayer capacitor may further comprise a fifth terminal unit connected to the fifth inner electrode included in the capacitor element body. In this multilayer capacitor, the first terminal unit may be arranged between the third and fifth terminal units on a longitudinal side face of the capacitor element body exhibiting a rectangular parallelepiped form. This can clarify the position of a lead electrode part of the first inner electrode constituting the first capacitor unit. As a result, when forming a high resistance part in the first terminal unit, the position of the first terminal unit can be defined easily.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is a chart illustrating the circuit and ESR characteristics of the multilayer capacitor represented in FIG. 1;

FIG. 11 is a chart illustrating the circuit and ESR characteristics of the multilayer capacitor represented in FIG. 8;

FIG. 15 is a chart illustrating the circuit and ESR characteristics of the multilayer capacitor represented in FIG. 13;

FIG. 17 is a diagram illustrating a horizontal section and circuit of the multilayer capacitor represented in FIG. 16.

DESCRIPTION OF THE PREFERRED EMBODIMENTS

In the following, preferred embodiments of the present invention will be explained in detail with reference to the accompanying drawings. In the explanation, the same constituents or those having the same functions will be referred to with the same signs while omitting their overlapping descriptions.

First Embodiment

Figure 1:
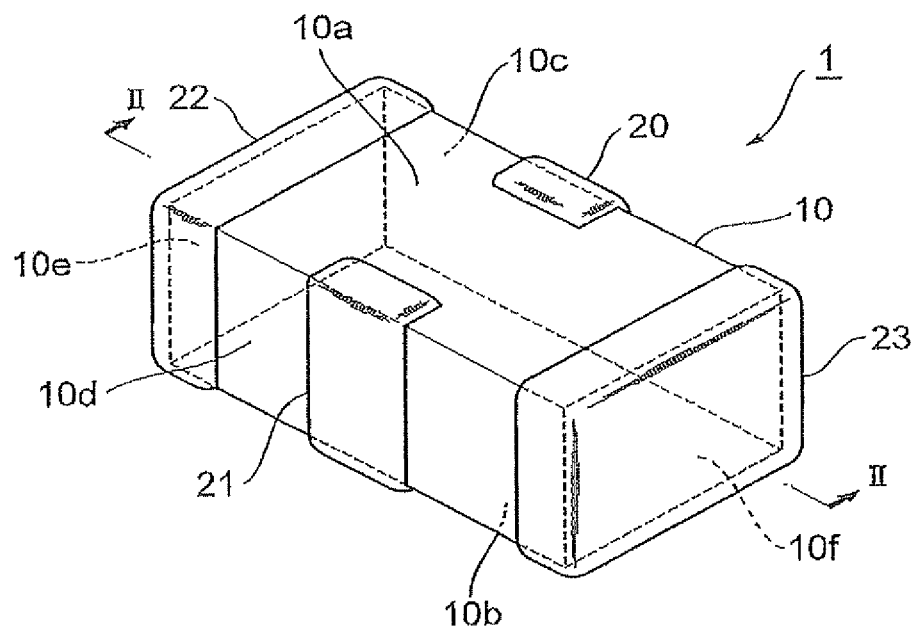
FIG. 1 is a perspective view illustrating the multilayer capacitor in accordance with a first embodiment.

As illustrated in FIG. 1, a multilayer capacitor 1 comprises a capacitor element body 10 having a substantially rectangular parallelepiped form, first and second terminal electrodes 20, 21 arranged on the outer surface of the capacitor element body 10, and third and fourth terminal electrodes 22, 23 arranged on the outer surface of the capacitor element body 10.

As the outer surface, the capacitor element body 10 has oblong first and second main faces 10*a*, 10*b* opposing each other, first and second side faces 10*c*, 10*d* opposing each other, and third and fourth side faces 10*e*, 10*f* opposing each other. The first and second side faces 10*c*, 10*d* extend in the longer side direction of the first and second main faces 10*a*, 10*b* so as to connect them to each other. The third and fourth side faces 10*e*, 10*f* extend in the shorter side direction of the first and second main faces 10*a*, 10*b* so as to connect them to each other.

The first terminal electrode 20 is arranged on the first side face 10*c* of the capacitor element body 10. The first terminal electrode 20 covers substantially the center of the first side face 10*c* in the opposing direction of the third and fourth side faces 10*e*, 10*f* so as to traverse it along the opposing direction of the first and second main faces 10*a*, 10*b*. The first terminal electrode 20 partly covers the end parts of the first and second main faces 10*a*, 10*b* on the first side face 10*c* side as well.

The second terminal electrode 21 is arranged on the second side face 10*d* of the capacitor element body 10. The second terminal electrode 21 covers substantially the center of the second side face 10*d* in the opposing direction of the third and fourth side faces 10*e*, 10*f* so as to traverse it along the opposing direction of the first and second main faces 10*a*, 10*b*. The second terminal electrode 21 partly covers the end parts of the first and second main faces 10*a*, 10*b* on the second side face 10*d* side as well. The first and second terminal electrodes 20, 21 oppose each other in the opposing direction of the first and second side faces 10*c*, 10*d*.

The third terminal electrode 22 is arranged on the third side face 10*e* of the capacitor element body 10. The third terminal electrode 22 is formed such as to cover the third side face 10*e* as a whole and extend to end parts (on the third side face 10*e* side) of the first and second main faces 10*a*, 10*b* and first and second side faces 10*c*, 10*d*.

The fourth terminal electrode 23 is arranged on the fourth side face 10*f* of the capacitor element body 10. The fourth terminal electrode 23 is formed such as to cover the fourth side face 10*f* as a whole and extend to end parts (on the fourth side face 10*f* side) of the first and second main faces 10*a*, 10*b* and first and second side faces 10*c*, 10*d*. The third and fourth terminal electrodes 22, 23 oppose each other in the opposing direction of the third and fourth side faces 10e, 10f.

Figure 2:
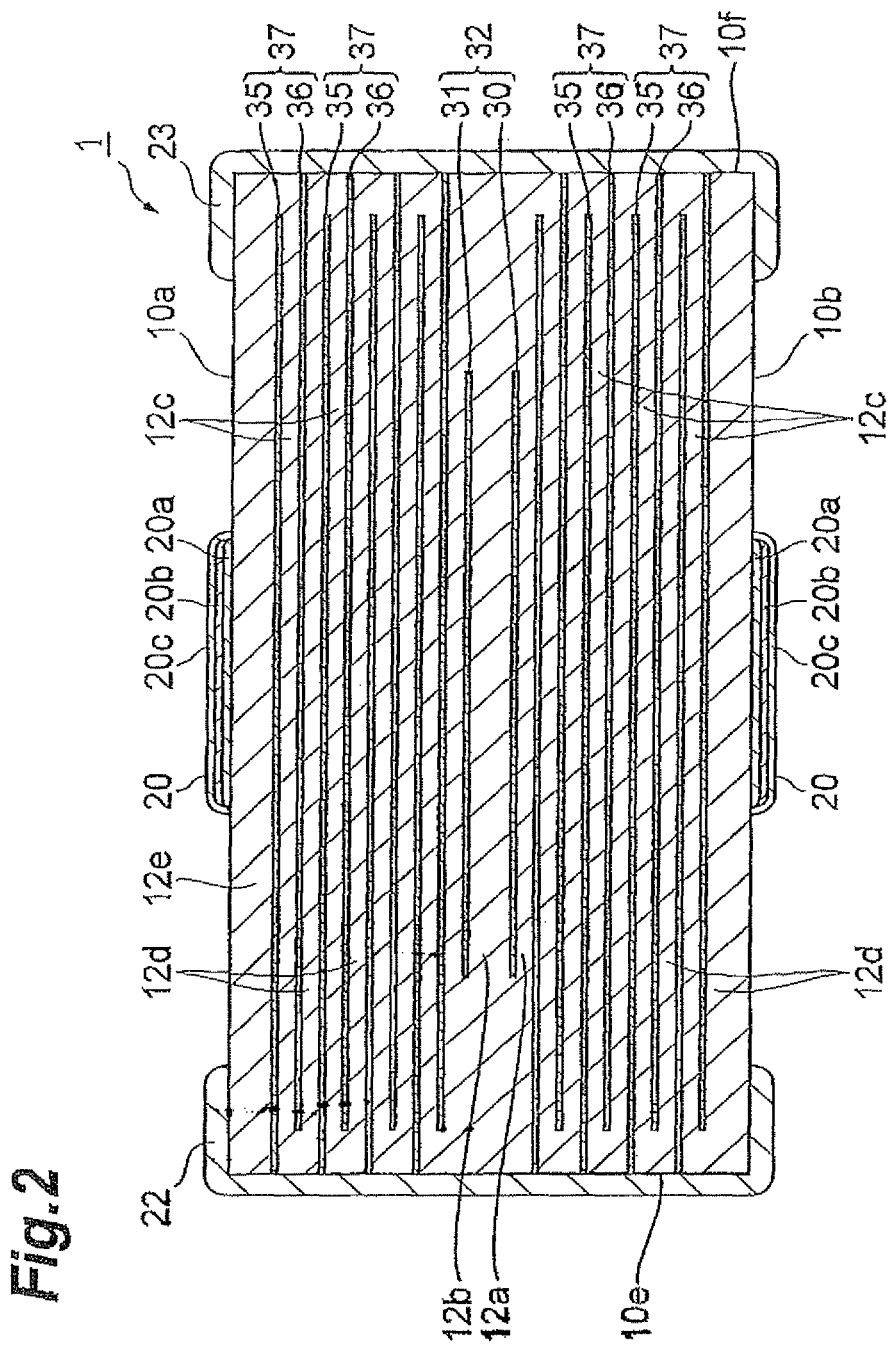
FIG. 2 is a sectional view of the multilayer capacitor taken along the line of FIG. 1.

As illustrated in FIG. 2, the capacitor element body 10 is constructed by stacking a plurality of dielectric layers 12a to 12e in the opposing direction of the first and second main faces 10a, 10b. Each of the dielectric layers 12a to 12e is constituted by a sintered body of a ceramic green sheet containing a dielectric ceramic (one based on $BaTiO_3$, $Ba(Ti, Zr)O_3$, $(Ba, Ca)TiO_3$, or the like), for example. The capacitor element body 10 in practice is integrated to such an extent that boundaries of the dielectric layers 12a to 12e are indiscernible. The dielectric layer 12e is the uppermost dielectric layer in the stacking direction and has a surface constituting the main face 10a of the capacitor element body 10.

Figure 3:
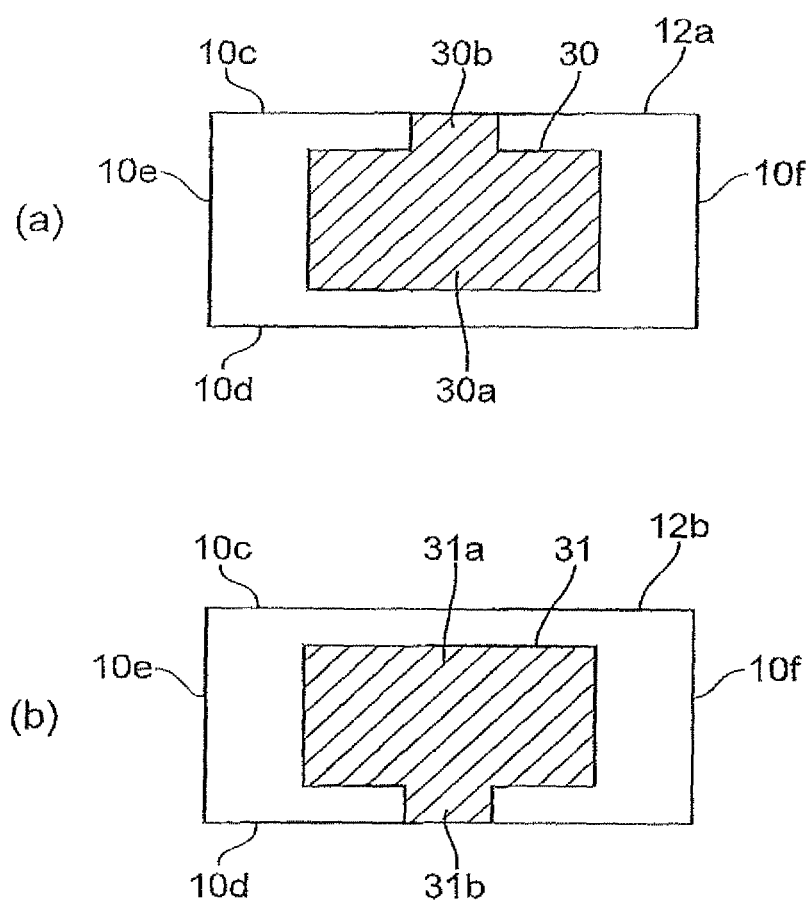
FIG. 3 is a plan view of inner electrodes constituting a first capacitor unit in the multilayer capacitor illustrated in FIG. 1.
Figure 4:
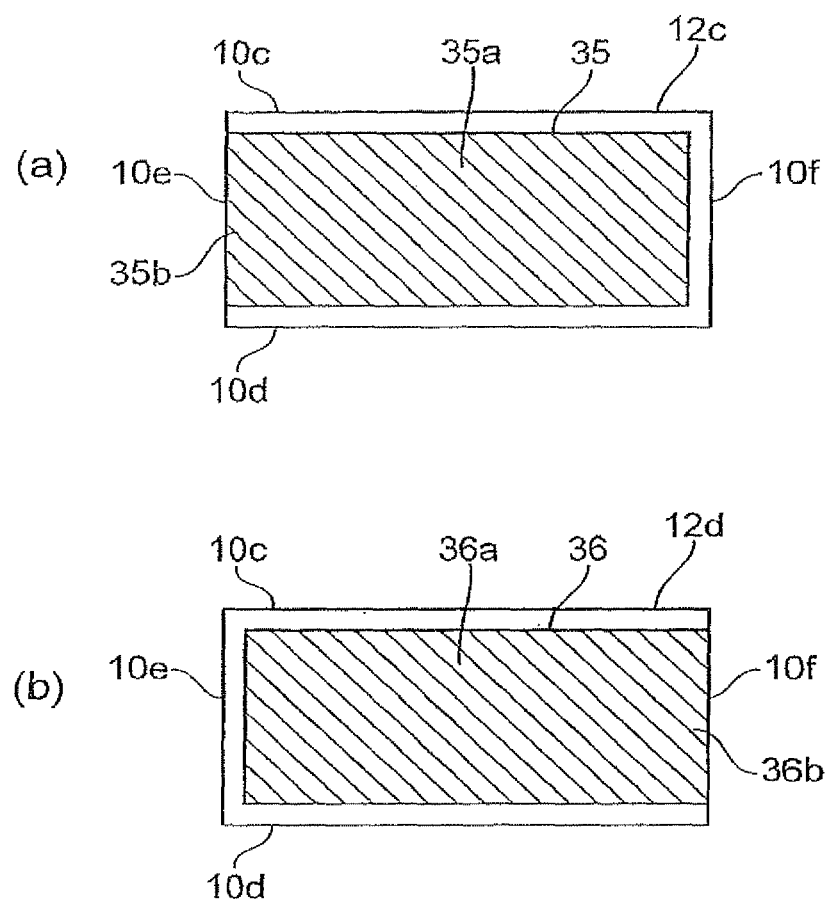
FIG. 4 is a plan view of inner electrodes constituting a second capacitor unit in the multilayer capacitor illustrated in FIG. 1.

As illustrated in FIGS. 2 to 4, a first inner electrode 30 formed on the dielectric layer 12a, a second inner electrode 31 formed on the dielectric layer 12b, a third inner electrode 35 formed on the dielectric layer 12c, and a fourth inner electrode 36 formed on the dielectric layer 12d are arranged within the capacitor element body 10.

As illustrated in FIG. 3(a), the first inner electrode 30 has a main electrode part 30a and a lead electrode part 30b. The main electrode part 30a has a rectangular form and is arranged at substantially the center of the dielectric layer 12a. The lead electrode part 30b extends from substantially the center of a longer side which is the end part on the first side face 10c side of the main electrode part 30a so as to be drawn to the first side face 10c. The lead electrode part 30b has an end exposed at the first side face 10c and is connected to the first terminal electrode 20 by the exposed end.

As illustrated in FIG. 3(b), the second inner electrode 31 has a main electrode part 31a and a lead electrode part 31b. The main electrode part 31a has a rectangular form and is arranged at substantially the center of the dielectric layer 12b such as to oppose the main electrode part 30a of the first inner electrode 30 substantially as a whole through the dielectric layer 12b in the stacking direction. The lead electrode part 31b extends from substantially the center of a longer side which is the end part on the second side face 10d side of the main electrode part 31a so as to be drawn to the second side face 10d. The lead electrode part 31b has an end exposed at the second side face 10d and is connected to the second terminal electrode 21 by the exposed end.

As illustrated in FIG. 4(a), the third inner electrode 35 has a main electrode part 35a and a lead electrode part 35b. The main electrode part 35a has a rectangular form and is arranged at substantially the center of the dielectric layer 12c. The lead electrode part 35b extends from the end part on the third side face 10e side of the main electrode part 35a by the same width as with the latter so as to be drawn to the third side face 10e. The lead electrode part 35b has an end exposed at the third side face 10e and is connected to the third terminal electrode 22 by the exposed end.

As illustrated in FIG. 4(b), the fourth inner electrode 36 has a main electrode part 36a and a lead electrode part 36b. The main electrode part 36a has a rectangular form and is arranged at substantially the center of the dielectric layer 12d such as to oppose the main electrode part 35a of the third inner electrode 35 substantially as a whole through the dielectric layer 12c. The lead electrode part 36b extends from the end part on the fourth side face 10f side of the main electrode part 36a by the same width as with the latter so as to be drawn to the fourth side face 10f. The lead electrode part 36b has an end exposed at the fourth side face 10f and is connected to the fourth terminal electrode 23 by the exposed end.

Thus stacking the first and second inner electrodes 30, 31 adjacent to each other through the dielectric layer 12b constructs a first capacitor unit 32. Stacking the third and fourth inner electrodes 35, 36 adjacent to each other through the dielectric layer 12c constructs a second capacitor unit 37. As illustrated in FIG. 2, the first capacitor unit 32 is arranged at the center of a plurality of second capacitor units 37 so as to be held therebetween in the stacking direction. That is, the first capacitor unit 32 and the second capacitor units 37 located thereon and thereunder form a sandwich structure in the stacking direction.

The structures of the terminal electrodes 20 to 23 connected to their corresponding inner electrodes 30, 31, 35, 36 constituting the first and second capacitor units 32, 37 will now be explained in further detail.

As illustrated in FIG. 2, the first terminal electrode 20 arranged on the first side face 10c is formed such as to extend from the first main face 10a to the second main face 10b as multiple layers. The first terminal electrode 20 with the multilayer structure has a first electrode layer 20a, formed such as to cover the exposed end of the first inner electrode 30, containing a conductive metal powder mainly composed of Ni, Cu, or the like and a glass frit; a high resistance layer 20b (high resistance part) formed such as to cover the first electrode layer 20a and mainly composed of ruthenium oxide ($RuO_2$), carbon, or the like; and a second electrode layer 20c formed such as to cover the high resistance layer 20b and mainly composed of Ni, Cu, or the like.

As with the first terminal electrode 20, the second terminal electrode 21 arranged on the second side face 10d is formed such as to extend from the first main face 10a to the second main face 10b as multiple layers and has first and second electrode layers and a high resistance layer (high resistance part) located therebetween.

On the other hand, each, of the third and fourth terminal electrodes 22, 23 is formed from a single electrode layer containing a conductive metal powder mainly composed of Ni, Cu, or the like and a glass frit, for example. Thus, the first and second terminal electrodes 20, 21 are constructed such as to exhibit electrical resistances higher than those of the third and fourth terminal electrodes 22, 23 by having the high resistance layers 20b, 21b.

Thus constructed first to fourth terminal electrodes 20 to 23 are formed by applying and burning the above-mentioned conductive paste or resistive paste onto predetermined parts of the outer surface of the capacitor element body 10. The first and second terminal electrodes 20, 21 are formed by applying their corresponding pastes to the first and second side faces 10c, 10d of the capacitor element body 10 by a transfer scheme, for example, and thus can be arranged accurately. Plated layers of Ni, Sn, and the like may be formed on the burned terminal electrodes 20 to 23 if necessary. The first to fourth terminal electrodes 20 to 23 are electrically insulated from each other on the surface of the capacitor element body 10.

Figure 5:
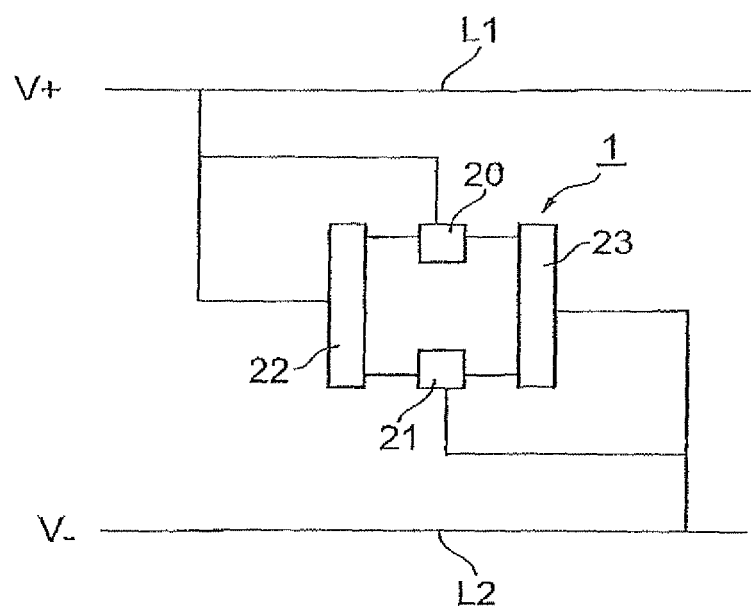
FIG. 5 is a diagram schematically illustrating a mounting structure of the multilayer capacitor illustrated in FIG. 1.

Characteristics of the multilayer capacitor 1 in which the first and second terminal electrodes 20, 21 include high resistance parts having electrical resistances higher than those of the third and fourth terminal electrodes 22, 23 will now be explained. As illustrated in FIG. 5, the multilayer capacitor 1 is mounted on a circuit board such as to be connected in parallel to an IC chip between two power lines L1, L2 forming a power supply circuit for the IC chip, for example. In this mounting structure, the first and third terminal electrodes 20, 22 are connected to the same polarity (positive polarity), while the second and fourth terminal electrodes 21, 23 are connected to the same polarity (negative polarity).

This connection lets the inner electrode 30 or 31 located closer to the second capacitor unit 37 in the first capacitor unit 32 and the inner electrode 36 or 35 located closer to the first capacitor unit 32 in the second capacitor unit 37 to attain the same polarity at a boundary region between the first and second capacitor units 32, 37 in the multilayer capacitor 1. Because of such a multilayer structure, the multilayer capacitor 1 becomes a circuit in which the first and second capacitor units 32, 37 are separated from each other as illustrated in FIG. 6(a), so as to isolate their ESR components from each other. Hence, appropriately setting the capacitances Cr, C1 of the first and second capacitor units 32, 37 and the value of the resistance R according to properties of signals (noises) and the like makes it possible to control the ESR value in a predetermined frequency band.

Specifically, when the capacitance C1 of the second capacitor unit 37 is set sufficiently lower than the capacitance Cr of the first capacitor unit 32 (Cr>>C1) in the multilayer capacitor 1, for example, the ESR can be made higher and lower in lower and higher frequency bands, respectively, as illustrated in FIG. 6(b). When the capacitance C1 of the second capacitor unit 37 is set sufficiently higher than the capacitance Cr of the first capacitor unit 32 (C1>>Cr) in the multilayer capacitor 1, on the other hand, the ESR can be made lower and higher in lower and higher frequency bands, respectively, as illustrated in FIG. 6(c).

As in the foregoing, the multilayer capacitor 1 in accordance with this embodiment is constructed such that the first and second terminal electrodes 20, 21 connected to the first and second inner electrodes 30, 31 constituting the first capacitor unit 32 have high resistance layers exhibiting electrical resistances higher than those of the third and fourth terminal electrodes 22, 23. Therefore, an assembly constituted by the first and second terminal electrodes 20, 21 having the high resistance layers and the first capacitor unit 32 can serve as an ESR control capacitor unit which can control the ESR value, whereby a composite capacitor comprising a general capacitor unit and the ESR control capacitor unit can be formed.

Mounting such a composite capacitor on a circuit board such that the general capacitor unit (corresponding to the second capacitor unit 37) and the ESR control capacitor unit (corresponding to the first capacitor unit 32 and the resistance R) are parallel each other, as illustrated in FIGS. 5 and 6(a) makes it possible to control the ESR value in a wide frequency band extending from a low frequency band to a high frequency band as represented in FIGS. 6(b) and 6(c), for example.

At the boundary region between the first and second capacitor units 32, 37 in the multilayer capacitor 1, the inner electrode 30 or 31 located closer to the second capacitor unit 37 in the first capacitor unit 32 and the inner electrode 36 or 35 located closer to the first capacitor unit 32 in the second capacitor unit 37 are connected to the same polarity. This allows the multilayer capacitor 1 to separate two ESR components from each other without combining them, whereby the ESR component in a specific frequency band can be controlled.

Figure 7:
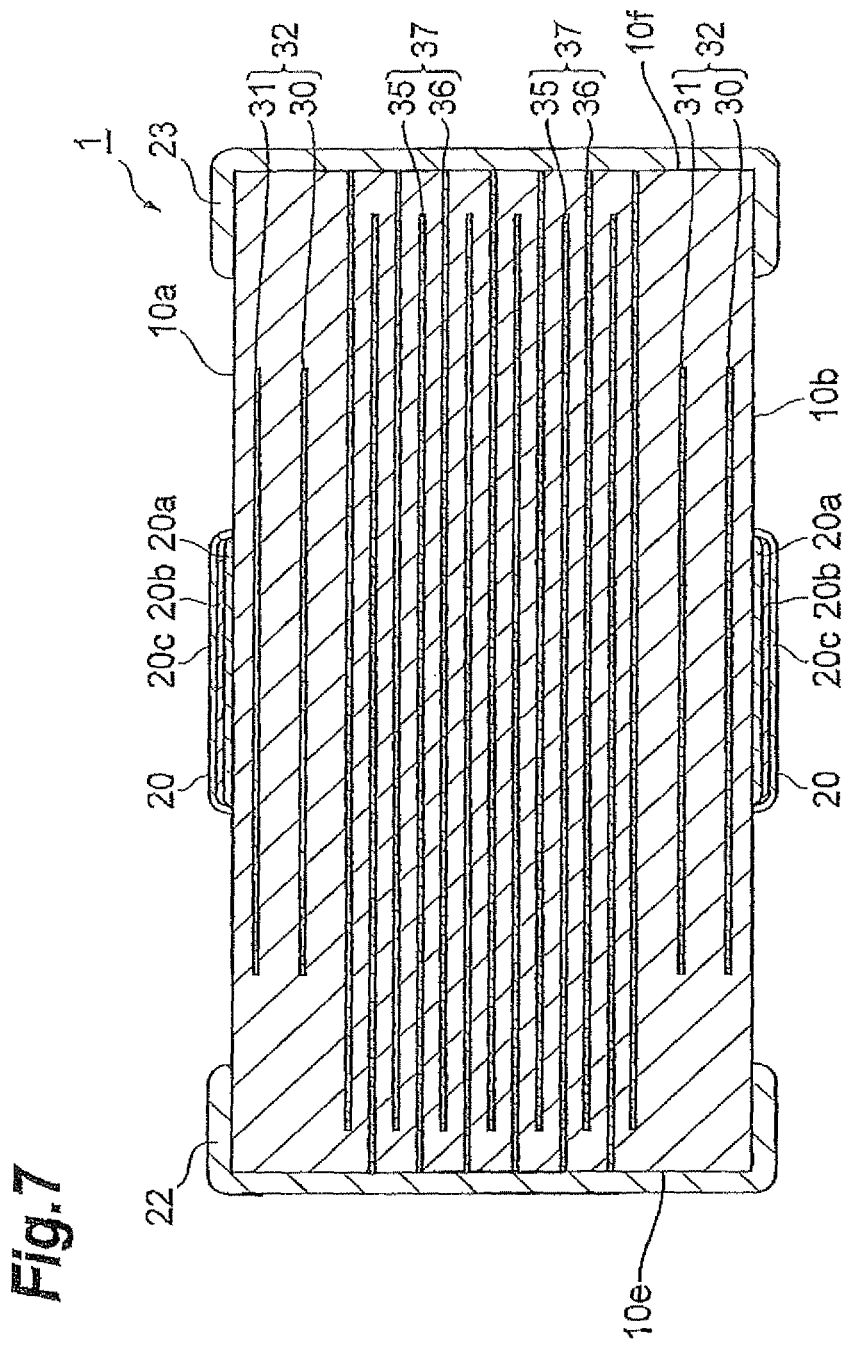
FIG. 7 is a vertical sectional view of a modified example of the multilayer capacitor in accordance with the first embodiment.

In the multilayer capacitor 1, the first capacitor unit 32 and the second capacitor units 37 form a sandwich structure in the stacking direction. This allows the multilayer capacitor 1 to attain a symmetrical structure in the stacking direction, thereby eliminating its mounting directivity and inhibiting characteristics from fluctuating. Though this embodiment is constructed such that the first capacitor unit 32 is held between the second capacitor units 37, the second capacitor unit 37 may be held between the first capacitor units 32 as illustrated in FIG. 7.

In the multilayer capacitor 1, the capacitor element body 10 has a rectangular parallelepiped form, while the first and second terminal electrodes 20, 21 are arranged on the longitudinal side faces 10c, 10d of the capacitor element body 10. This makes it easier to form the first and second terminal electrodes 20, 21 by transfer or the like so that they reliably have the high resistance layers.

In the first and second capacitor units 32, 37 in the multilayer capacitor 1, the one having the lower capacitance may be arranged on the mounting surface side. Such an arrangement can lower the ESL.

Second Embodiment

Figure 8:
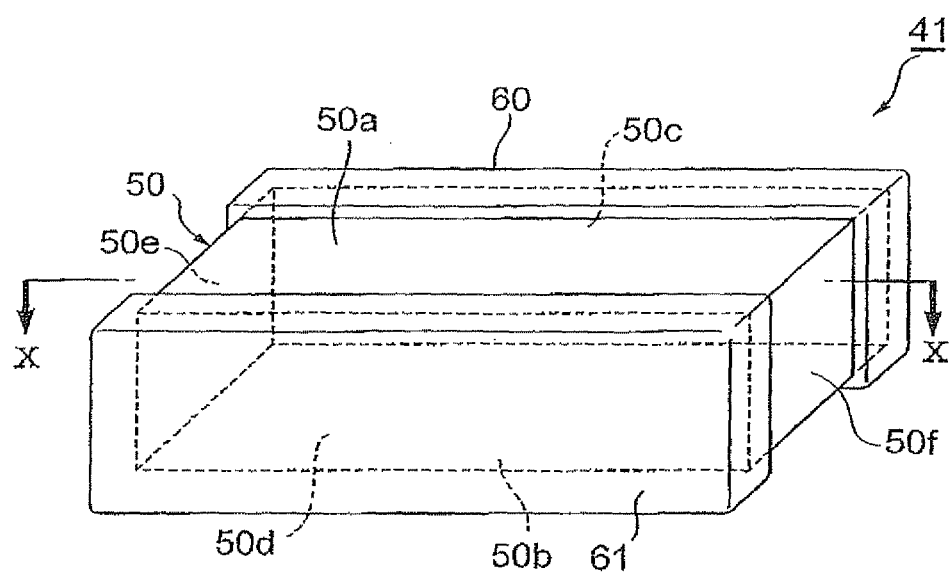
FIG. 8 is a perspective view illustrating the multilayer capacitor in accordance with a second embodiment.

A multilayer capacitor 41 in accordance with the second embodiment will now be explained. As illustrated in FIG. 8, the multilayer capacitor 41 comprises a capacitor element body 50 having a substantially rectangular parallelepiped form and first and second terminal electrodes 60, 61 (first and second integral terminal electrodes) arranged on the outer surface of the capacitor element body 50. The capacitor element body 50 has, as its outer surface, first and second main faces 50a, 50b, first and second side faces 50c, 50d, and third and fourth side faces 50e, 50f as in the first embodiment.

The first terminal electrode 60 is arranged on the first side face 50c of the capacitor element body 50. The first terminal electrode 60 is formed such as to cover the first side face 50c as a whole and extend to end parts (on the first side face 50c side) of the first and second main faces 50a, 50b and third and fourth side faces 50e, 50f.

The second terminal electrode 61 is arranged on the second side face 50d of the capacitor element body 50. The second terminal electrode 61 is formed such as to cover the second side face 50d as a whole and extend to end parts (on the second side face 50d side) of the first and second main faces 50a, 50b and third and fourth side faces 50e, 50f. The first and second terminal electrodes 60, 61 oppose each other in the opposing direction of the first and second side faces 50c, 50d.

As in the first embodiment, the capacitor element body 50 is constructed by stacking a plurality of dielectric layers 12e to 12g in the opposing direction of the first and second main faces 50a, 50b, while having therewithin alternately stacked sets of first and third inner electrodes 70, 75 formed on the dielectric layer 12f and second and fourth inner electrodes 71, 76 formed on the dielectric layer 12g. The number of stacked layers of the first and third inner electrodes 70, 75 and second and fourth inner electrodes 71, 76 is set appropriately according to the values of ESR and capacitance to be controlled.

Figure 9:
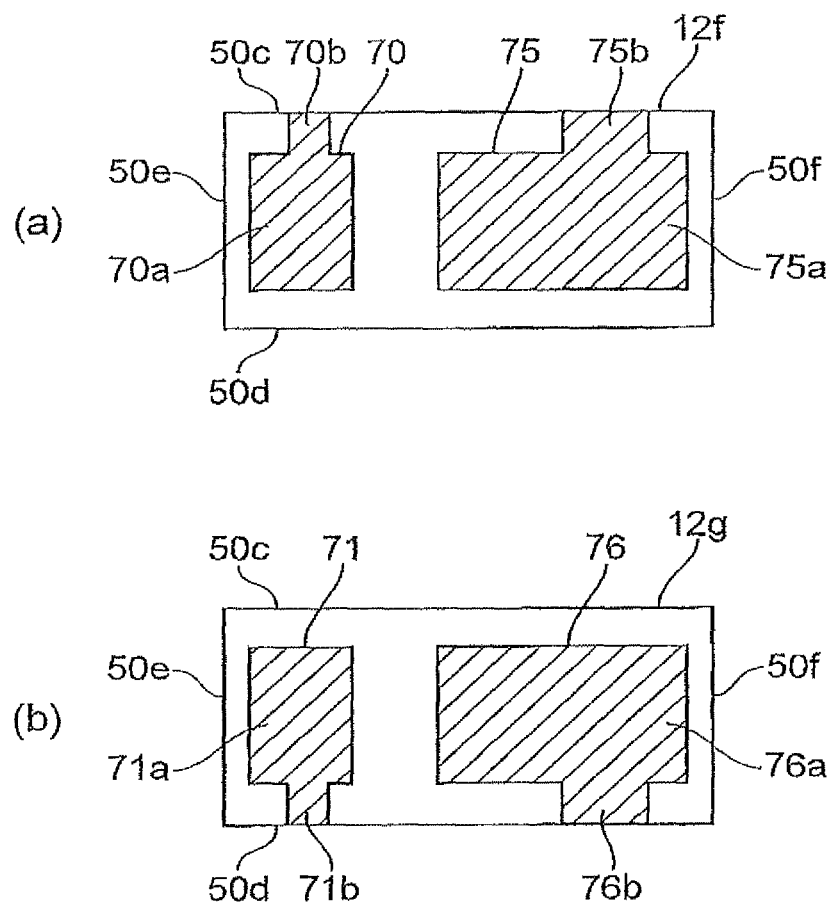
FIG. 9 is a plan view of inner electrodes constituting first and second capacitor units of the multilayer capacitor illustrated in FIG. 8.

As illustrated in FIG. 9(a), the first inner electrode 70 has a main electrode part 70a and a lead electrode part 70b. The main electrode part 70a exhibits a rectangular form and is arranged closer to the third side face 50e than is the center of the dielectric layer 12f. The lead electrode part 70b extends from substantially the center of a shorter side which is the end part on the first side face 50c side of the main electrode part 70a so as to be drawn to the first side face 50c. The lead electrode part 70b has an end exposed at the first side face 50c and is connected to the first terminal electrode 60 by the exposed end.

As illustrated in FIG. 9(b), the second inner electrode 71 has a main electrode part 71a and a lead electrode part 71b. The main electrode part 71a exhibits a rectangular form and is arranged closer to the third side face 50e than is the center of the dielectric layer 12g so as oppose the main electrode part 70a of the first inner electrode 70 substantially as a whole through the dielectric layer 12f in the stacking direction. The lead electrode part 71b extends from substantially the center of a shorter side which is the end part on the second side face 50d side of the main electrode part 71a so as to be drawn to the second side face 50d. The lead electrode part 71b has an end exposed at the second side face 50d and is connected to the second terminal electrode 61 by the exposed end.

As illustrated in FIG. 9(a), the third inner electrode 75 has a main electrode part 75a and a lead electrode part 75b. The main electrode part 75a exhibits a rectangular form and is arranged such as to approach the fourth side face 50f from near the center of the dielectric layer 12f. The lead electrode part 75b extends from a longer side which is the end part on the first side face 50c side of the main electrode part 75a so as to be drawn to the first side face 50c. The lead electrode part 75b has an end exposed at the first side face 50c and is connected to the first terminal electrode 60 by the exposed end, While being arranged on the same plane, the first and third inner electrodes 70, 75 are separated and electrically insulated from each other.

As illustrated in FIG. 9(b), the fourth inner electrode 76 has a main electrode part 76a and a lead electrode part 76b. The main electrode part 76a exhibits a rectangular form and is arranged such as to approach the fourth side face 50f from near the center of the dielectric layer 12g and oppose the main electrode part 75a of the third inner electrode 75 substantially as a whole through the dielectric layer 12f in the stacking direction. The lead electrode part 76b extends from a longer side which is the end part on the second side face 50d side of the main electrode part 76a so as to be drawn to the second side face 50d. The lead electrode part 76b has an end exposed at the second side face 50d and is connected to the second terminal electrode 61 by the exposed end. While being arranged on the same plane, the second and fourth inner electrodes 71, 76 are separated and electrically insulated from each other.

Figure 10:
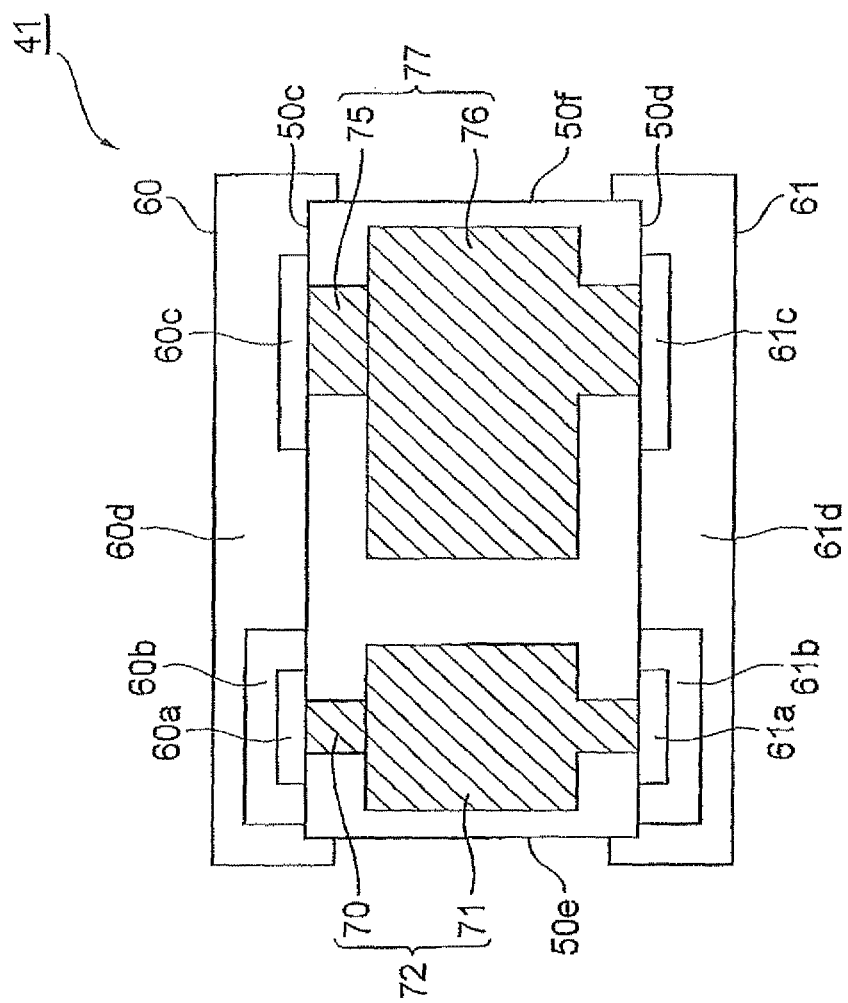
FIG. 10 is a sectional view of the multilayer capacitor taken along the line X-X of FIG. 8.

Thus stacking the first and second inner electrodes 70, 71 adjacent to each other through the dielectric layer 12f constructs a first capacitor unit 72 (see FIG. 10). Stacking the third and fourth inner electrodes 75, 76 adjacent to each other through the dielectric layer 12f constructs a second capacitor unit 77.

The structures of the terminal electrodes 60, 61 connected to their corresponding inner electrodes 70, 71, 75, 76 constituting the first and second capacitor units 72, 77 will now be explained in further detail with reference to FIG. 10.

As in the first embodiment, the first terminal electrode 60 arranged on the first side face 50c is formed such as to extend from the first main face 50a to the second main face 50b as multiple layers. However, the first terminal electrode in this embodiment has a three-layer structure near the end part where the first inner electrode 70 is exposed, but a two-layer structure near the end part where the third inner electrode 75 is exposed.

The first terminal electrode 60 with the multilayer structure has a first electrode layer 60a containing a conductive metal powder mainly composed of Ni or the like and a glass frit and covering the exposed end of the first inner electrode 70; a high resistance layer 60b (high resistance part) formed such as to cover the first electrode layer 60a and mainly composed of ruthenium oxide ($RuO_2$) or the like; a third electrode layer 60c containing a conductive metal powder mainly composed of Ni or the like and a glass fit and covering the exposed end of the third inner electrode 75; and a second electrode layer 60d formed such as to cover the high resistance layer 60b and third electrode layer 60c and mainly composed of Ni or the like.

As with the first terminal electrode 60, the second terminal electrode 61 arranged on the second side face 50d is formed such as to extend from the first main face 50a to the second main face 50b as multiple layers exhibiting a three-layer structure near the end part where the second inner electrode 71 is exposed and a two-layer structure near the end part where the fourth inner electrode 76 is exposed. The second terminal electrode 61 has a first electrode layer 61 a containing a conductive metal powder mainly composed of Cu, Ni, or the like and a glass frit and covering the exposed end of the second inner electrode 71; a high resistance layer 61b (high resistance part) formed such as to cover the first electrode layer 61a and mainly composed of ruthenium oxide ($RuO_2$) or the like; a third electrode layer 61c containing a conductive metal powder mainly composed of Cu, Ni, or the like and a glass frit and covering the exposed end of the fourth inner electrode 76; and a second electrode layer 61d formed such as to cover the high resistance layer 61b and the third electrode layer 61c and mainly composed of Cu, Ni, or the like. Plated layers of Ni, Sn, and the like may be formed on the second electrode layer 61d.

This embodiment differs from the first embodiment in that the first terminal unit connected to the first inner electrode 70 and the third terminal unit connected to the third inner electrode 75 are integrated into the first terminal electrode 60, while the second terminal unit connected to the second inner electrode 71 and the fourth terminal unit connected to the fourth inner electrode 76 are integrated into the second terminal electrode 61.

When the terminal units are seen individually, the first terminal unit is constituted by the first electrode layer 60a, the high resistance layer 60b, and a part of the second electrode layer 60d which covers the high resistance layer 60b, while the second terminal unit is constituted by the first electrode layer 61a, the high resistance layer 61b, and a part of the second electrode layer 61d which covers the high resistance layer 61b. The third terminal unit is constituted by the third electrode layer 60c and a part of the second electrode layer 60d which covers the third electrode layer 60c, while the fourth terminal unit is constituted by the third electrode layer 61c and a part of the second electrode layer 61d which covers the third electrode layer 61c.

That is, when seen as terminal units, the first and second terminal units connected to the first and second inner electrodes 70, 71 constituting the first capacitor unit 72 have the high resistance layers 60b, 61b exhibiting electrical resistances higher than those of the third and fourth terminal units, respectively, in the multilayer capacitor 41 in accordance with this embodiment, as in the first embodiment. Therefore, in the multilayer capacitor 41, the assembly constructed by the first and second terminal units having the high resistance layers 60b, 61b and the first capacitor unit 72 can serve as an ESR control capacitor unit which can control the ESR value, whereby a composite capacitor comprising a general capacitor unit and the ESR control capacitor unit can be formed.

As a result, when such a composite capacitor is mounted to a circuit board such that the general capacitor unit (corresponding to the second capacitor unit 77) and the ESR control capacitor unit (corresponding to the first capacitor unit 72 and resistance R) are parallel to each other as illustrated in FIG. 11(a), the ESR can be made higher and lower in lower and higher frequency bands, respectively, in the case where the capacitance C1 of the second capacitor unit 77 is set sufficiently lower than the capacitance Cr of the first capacitor unit 72 (Cr>>C1) in the multilayer capacitor 41 as illustrated in FIG. 11(b), for example.

In the case where the capacitance C1 of the second capacitor unit 77 is set sufficiently higher than the capacitance Cr of the first capacitor unit 72 (C1>>Cr) in the multilayer capacitor 41, on the other hand, the ESR can be made lower and higher in lower and higher frequency bands, respectively, as illustrated in FIG. 11(c). That is, the multilayer capacitor 41 can control the ESR value in a wide frequency band extending from a low frequency band to a high frequency band.

In the multilayer capacitor 41, as mentioned above, the first and third terminal units are integrated into the first terminal electrode 60, while the second and fourth terminal units are integrated into the second terminal electrode 61. Since the first to fourth terminal units are integrated into the two terminal electrodes 60, 61, the multilayer capacitor 41 in accordance with this embodiment can prevent wrong connections from being made at the time of mounting to a circuit board and the like. Forming the terminal units into the two terminal electrodes 60, 61 also facilitates the making of the capacitor.

Figure 12:
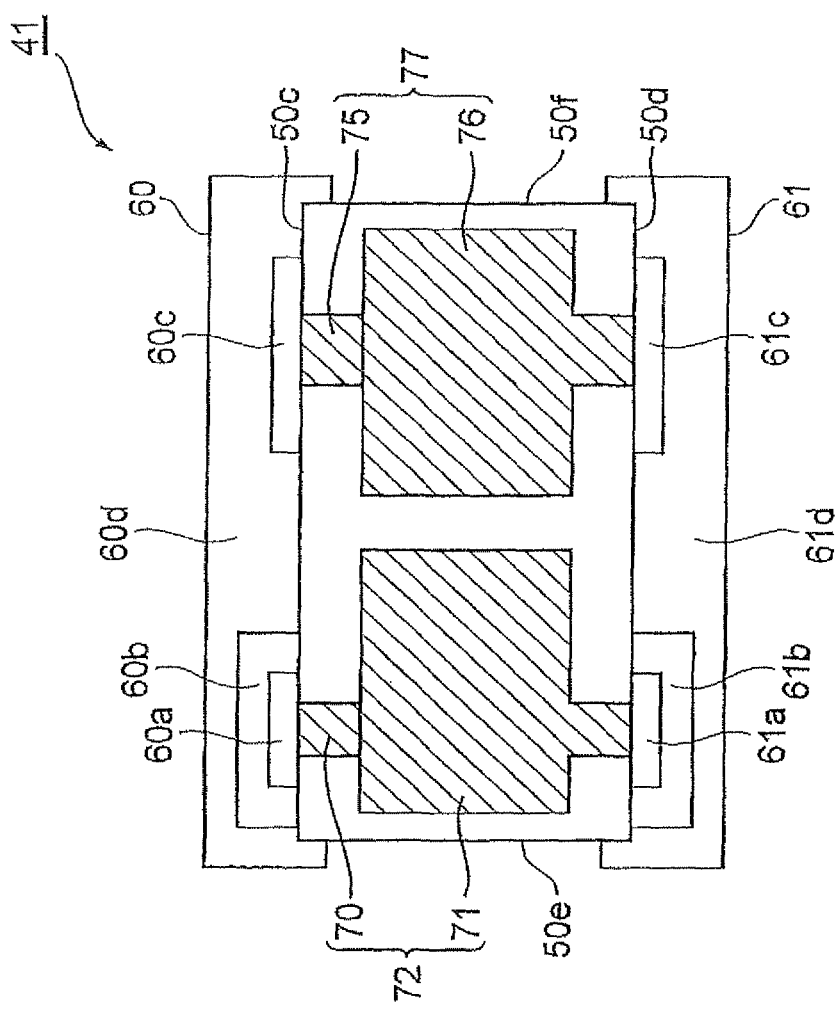
FIG. 12 is a horizontal sectional view of a modified example of the multilayer capacitor in accordance with the second embodiment.

In the multilayer capacitor 41, the first and third inner electrodes 70, 75 are arranged on the same plane in the stacking direction, and so are the second and fourth inner electrodes 71, 76. Thus arranging two kinds of inner electrodes on the same plane can reduce the number of stacked layers as compared with the case where the first to fourth inner electrodes 70, 71, 75, 76 are arranged on respective dielectric layers. When arranging the first and third inner electrodes 70, 75 on the same plane and the second and fourth inner electrodes 71, 76 on the same plane as in this embodiment, the first and third inner electrodes 70, 75 may have substantially the same size or the second and fourth inner electrodes 70, 75 may have substantially the same size as illustrated in FIG. 12, for example.

Third Embodiment

Figure 13:
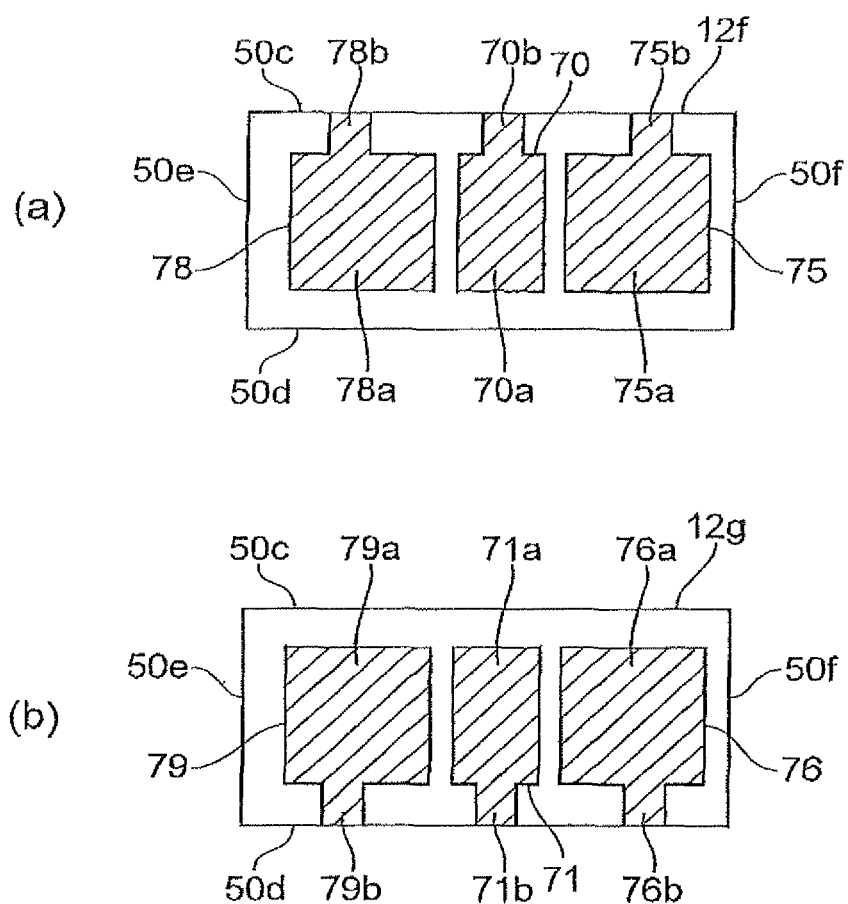
FIG. 13 is a plan view of inner electrodes constituting first to third capacitor units in the multilayer capacitor in accordance with a third embodiment.
Figure 14:
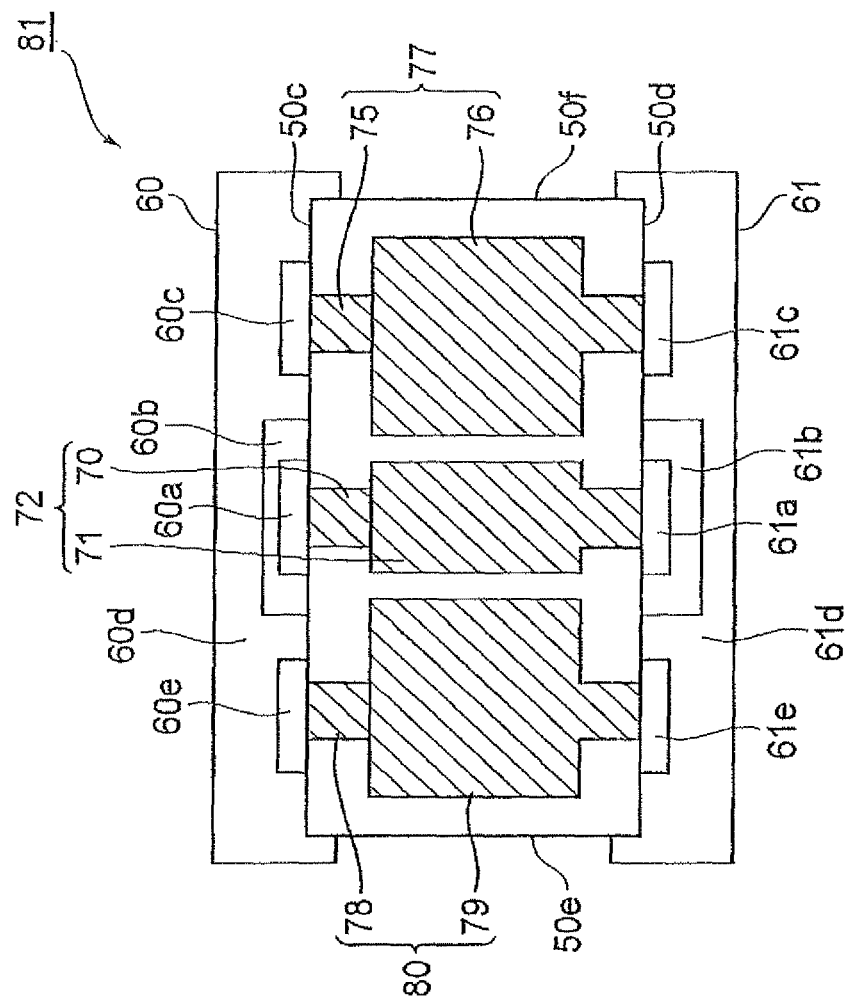
FIG. 14 is a horizontal sectional view of the multilayer capacitor illustrated in FIG. 13.

A multilayer capacitor 81 in accordance with the third embodiment will now be explained. As in the second embodiment, the multilayer capacitor 81 comprises a capacitor element body 50 having a substantially rectangular parallelepiped form and first and second terminal electrodes 60, 61 arranged on the outer surface of the capacitor element body 50 (see FIG. 8). The multilayer capacitor 81 in accordance with the third embodiment differs from that of the second embodiment in terms of the structures of inner electrodes arranged within the capacitor element body 50, which will be explained in the following with reference to FIGS. 13 and 14.

As illustrated in FIG. 13(a), the multilayer capacitor 81 is constructed such that a fifth inner electrode 78 is further arranged on the dielectric layer 12f on which the first and third inner electrodes 70, 75 are placed, while the first inner electrode 70 is located between the third and fifth inner electrodes 75, 78 in the opposing direction of the third and fourth side faces 50e, 50f.

The fifth inner electrode 78 exhibits a form which is symmetrical to the third inner electrode 75 about a line and has a main electrode part 78a and a lead electrode part 78b. The main electrode part 78a exhibits a rectangular form and is arranged closer to the third side face 50e than is the center of the dielectric layer 12f. The lead electrode part 78b extends from the end part on the first side face 50c side of the main electrode part 78a so as to be drawn to the first side face 50c. The lead electrode part 78b has an end exposed at the first side face 50c and is connected to the first terminal electrode 60 (third electrode layer 60e) by the exposed end. While being arranged on the same plane, the first, third, and fifth inner electrodes 70, 75, 78 are separated and electrically insulated from each other.

As illustrated in FIG. 13(b), the multilayer capacitor 81 is constructed such that a sixth inner electrode 79 is further arranged on the dielectric layer 12g on which the second and fourth inner electrodes 71, 76 are placed, while the second inner electrode 71 is located between the fourth and sixth inner electrodes 76, 79 in the opposing direction of the third and fourth side faces 50e, 50f. The fifth and sixth inner electrodes 78, 79 form the third capacitor unit 80 as with the second capacitor unit 77.

The sixth inner electrode 79 exhibits a form which is symmetrical to the fourth inner electrode 76 about a line and has a main electrode part 79a and a lead electrode part 79b. The main electrode part 79a exhibits a rectangular form and is arranged closer to the third side face 50e than is the center of the dielectric layer 12g. The lead electrode part 79b extends from the end part on the second side face 50d side of the main electrode part 79a so as to be drawn to the second side face 50d. The lead electrode part 79b has an end exposed at the second side face 50d and is connected to the second terminal electrode 61 (third electrode layer 61e) by the exposed end. While being arranged on the same plane, the second, fourth, and sixth inner electrodes 71, 76, 79 are separated and electrically insulated from each other.

Thus, in this embodiment, the first terminal unit connected to the first inner electrode 70, the third terminal unit connected to the third inner electrode 75, and the fifth terminal unit connected to the fifth inner electrode 78 are integrated into the first terminal electrode 60. The second terminal unit connected to the second inner electrode 71, the fourth terminal unit connected to the fourth inner electrode 76, and the sixth terminal unit connected to the sixth inner electrode 79 are integrated into the second terminal electrode 61.

When the terminal units are seen individually as in the second embodiment, the first to fourth terminal units are constructed as in the second embodiment, the fifth terminal unit is constituted by the third electrode layer 60e and a part of the second electrode layer 60d covering the third electrode layer 60e, and the sixth terminal unit is constituted by the third electrode layer 61e and a part of the second electrode layer 61d covering the third electrode layer 61e.

That is, when seen as terminal units, the first and second terminal units connected to the first and second inner electrodes 70, 71 constituting the first capacitor unit 72 have the high resistance layers 60b, 61b exhibiting electrical resistances higher than those of the third to sixth terminal units, respectively, in the multilayer capacitor 81 in accordance with this embodiment as in the first and second embodiments. Therefore, in the multilayer capacitor 81, the assembly constructed by the first and second terminal units having the high resistance layers 60b, 61b and the first capacitor unit 72 can serve as an ESR control capacitor unit which can control the ESR value, whereby a composite capacitor comprising a general capacitor unit and the ESR control capacitor unit can be formed. In addition, two general capacitor units can be provided in parallel to each other in this embodiment.

As a result, when such a composite capacitor is mounted to a circuit board such that the general capacitor unit (corresponding to the second and third capacitor units 77, 80) and the ESR control capacitor unit (corresponding to the first capacitor unit 72 and the resistance R) are parallel to each other as illustrated in FIG. 15(a), the ESR can be made lower and higher in lower and higher frequency bands, respectively, in the case where the capacitance C1+C2 (C1=C2) of the second and third capacitor units 77, 80 is set sufficiently higher than the capacitance Cr of the first capacitor unit 72 (C1+C2>>Cr) in the multilayer capacitor 81 as illustrated in FIG. 15(b), for example.

In the case where the capacitance C1 of the second capacitor unit 77 and the capacitance C2 of the third capacitor unit 80 are set sufficiently higher and lower than the capacitance Cr of the first capacitor unit 72, respectively (C1>>Cr>>C2), the ESR can be made lower, higher, and lower in lower, intermediate, and higher frequency bands, respectively, in the multilayer capacitor 81 as illustrated in FIG. 15(*c*).

The multilayer capacitor 81 further comprises the fifth terminal unit connected to the fifth inner electrode 78 included in the capacitor element body 50, while the first terminal unit is arranged between the third and fifth terminal units on a longitudinal side face of the capacitor element body 50 exhibiting a rectangular parallelepiped form. Therefore, the lead electrode part 70*b* of the first inner electrode 70 constituting the first capacitor unit can be located clearly. As a result, the position of the high resistance layer 60*b* to be formed in the first terminal unit can be defined easily. The same holds when forming the high resistance layer 61*b* in the second terminal unit.

Figure 16:
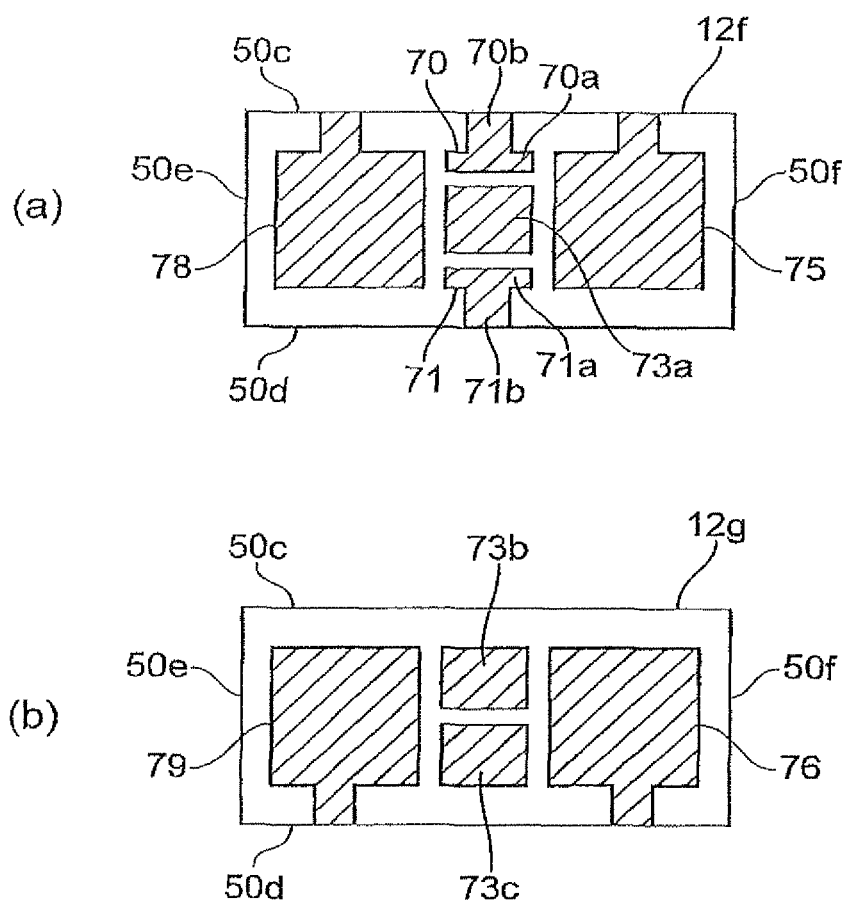
FIG. 16 is a plan view of inner electrodes constituting first to third capacitor units in the multilayer capacitor in accordance with a modified example of the multilayer capacitor in accordance with the third embodiment.

When forming the first to third capacitor units 72, 77, 80 as in this embodiment, as illustrated in FIGS. 16 and 17, the first and second inner electrodes 70, 71 may be disposed on the same dielectric layer 12*f* while interposing the inner electrode 73*a* therebetween, and the inner electrodes 73*b*, 73*c* may be arranged on the dielectric layer 12*g* such that they oppose the main electrode parts 70*a*, 71*a* of the first and second inner electrodes 70, 71 on their one end side in the stacking direction. The inner electrodes 73*b*, 73*c* oppose the inner electrode 73*a* on their other end side in the stacking direction. In this case, the first capacitor unit 72 can be constructed by a plurality of capacitors connected in series.

Though preferred embodiments of the present invention have been explained in detail in the foregoing, the present invention can be modified in various ways without being restricted to the above-mentioned embodiments. For example, while the first embodiment and the like illustrate a mounting structure which connects the first and third terminal electrodes 20, 22 to the same polarity and the second and fourth terminal electrodes 21, 23 to the same polarity as illustrated in FIG. 5, the mounting structure may connect the first and fourth terminal electrodes 20, 23 to the same polarity and the second and third terminal electrodes 21, 22 to the same polarity. Since the multilayer capacitor 1 is separated into the first and second capacitor units 32, 37, either connecting the first and third terminal electrodes 20, 22 to the same polarity or the first and fourth terminal electrodes 20, 23 to the same polarity can generate a capacitance.

The first and second terminal electrodes 20, 21 having high resistance parts, which oppose the first and second side faces 10*c*, 10*d* in the first embodiment, may oppose the third and fourth side faces 10*e*, 10*f*. In this case, the inner electrodes 35, 36 construct the first capacitor unit 32, while the inner electrodes 30, 31 construct the second capacitor unit 37.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
   a capacitor element body having a first capacitor unit including first and second inner electrodes stacked adjacent to each other through a dielectric layer and a second capacitor unit including third and fourth inner electrodes stacked adjacent to each other through a dielectric layer;
   a first terminal unit arranged on an outer surface of the capacitor element body and connected to the first inner electrode, the first inner electrode being covered with a first electrode layer:
   a second terminal unit arranged on the outer surface of the capacitor element body and connected to the second inner electrode;
   a third terminal unit arranged on the outer surface of the capacitor element body and connected to the third inner electrode, the third inner electrode being covered with a third electrode layer: and
   a fourth terminal unit arranged on the outer surface of the capacitor element body and connected to the fourth inner electrode;
   wherein:
      the first and third terminal units are integrated into a first integral terminal electrode, while the second and fourth terminal units are integrated into a second integral terminal electrode,
      the first terminal units have a high resistance part exhibiting an electrical resistance higher than that of the third and fourth terminal units, and
      the high resistance part is a high resistance layer that covers the first electrode layer formed so as to cover an exposed end of the first inner electrode of the first capacitor unit, and
      the high resistance layer and the third electrode layer are directly covered with a second electrode layer.

2. A multilayer capacitor according to claim 1, wherein at least one of the sets of the first and third inner electrodes and the second and fourth inner electrodes are arranged on the same plane in the stacking direction.

3. A multilayer capacitor according to claim 1, further comprising a fifth terminal unit connected to a fifth inner electrode included in the capacitor element body;
   wherein the first terminal unit is arranged between the third and fifth terminal units on a longitudinal side face of the capacitor element body exhibiting a rectangular parallelepiped form.

4. A multilayer capacitor according to claim 1, wherein the first terminal unit has a second electrode layer that covers the high resistance layer, and
   the high resistance layer is interposed between the first electrode layer and the second electrode layer.

5. A multilayer capacitor according to claim 1, wherein the high resistance layer includes ruthenium oxide or carbon.

6. A multilayer capacitor comprising:
   a capacitor element body having a first capacitor unit including first and second inner electrodes stacked adjacent to each other through a dielectric layer and a second capacitor unit including third and fourth inner electrodes stacked adjacent to each other through a dielectric layer;
   a first terminal unit arranged on an outer surface of the capacitor element body and connected to the first inner electrode;
   a second terminal unit arranged on the outer surface of the capacitor element body and connected to the second inner electrode;
   a third terminal unit arranged on the outer surface of the capacitor element body and connected to the third inner electrode; and
   a fourth terminal unit arranged on the outer surface of the capacitor element body and connected to the fourth inner electrode;
   wherein:
      the first terminal and the third terminal unit are integrated into a first integral terminal electrode, while the second terminal unit and the fourth terminal unit are integrated into a second integral terminal electrode, the first terminal unit has a high resistance part exhibiting an electrical resistance higher than that that of the third terminal unit and the fourth terminal unit, the capacitor element body further comprises a third capacitor unit including fifth and sixth inner electrodes stacked adjacent to each other through a dielectric layer, and the first to third capacitor units have respective capacitances decreasing in the order of the second, first, and third capacitor units.

7. A multilayer capacitor according to claim 6 wherein the first terminal unit has a second electrode layer that covers the high resistance layer, and the high resistance layer is interposed between the first electrode layer and the second electrode layer.

8. A multilayer capacitor according to claim 6, wherein the high resistance layer includes ruthenium oxide or carbon.

\* \* \* \* \*